(No Model.)　　　　　　　　　　　　　　　　2 Sheets—Sheet 1.
E. H. JOHNSTON.
MACHINE FOR BEVELING THE EDGES OF METAL PLATES.
No. 275,666.　　　　　　　　　Patented Apr. 10, 1883.
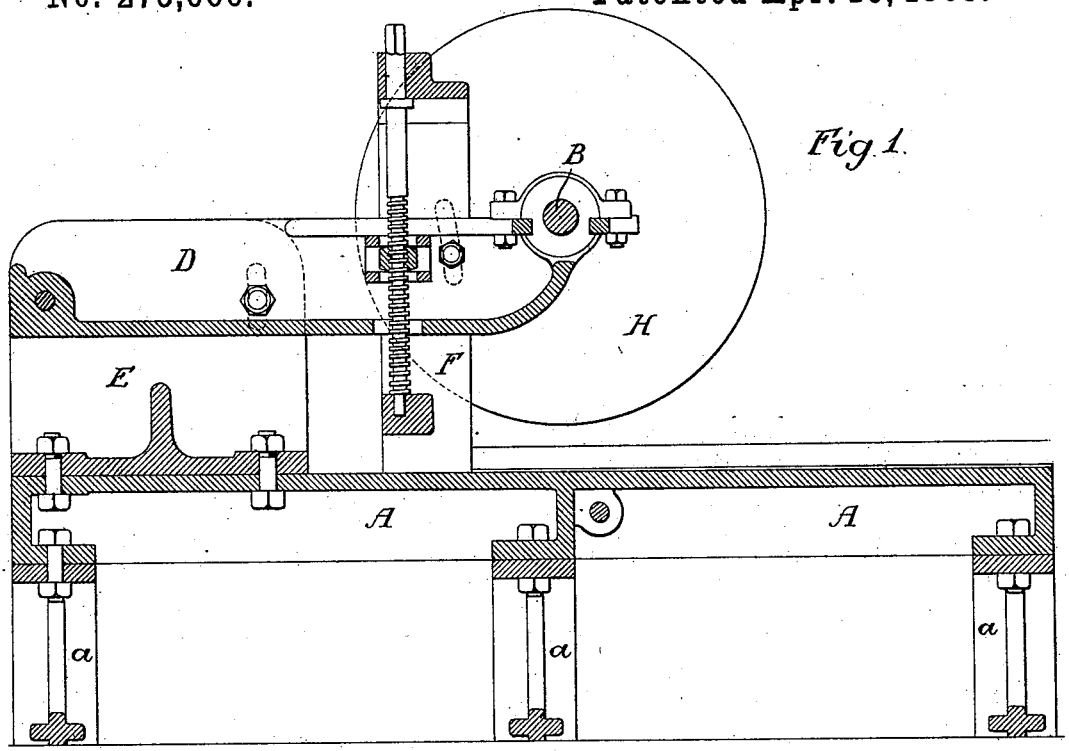
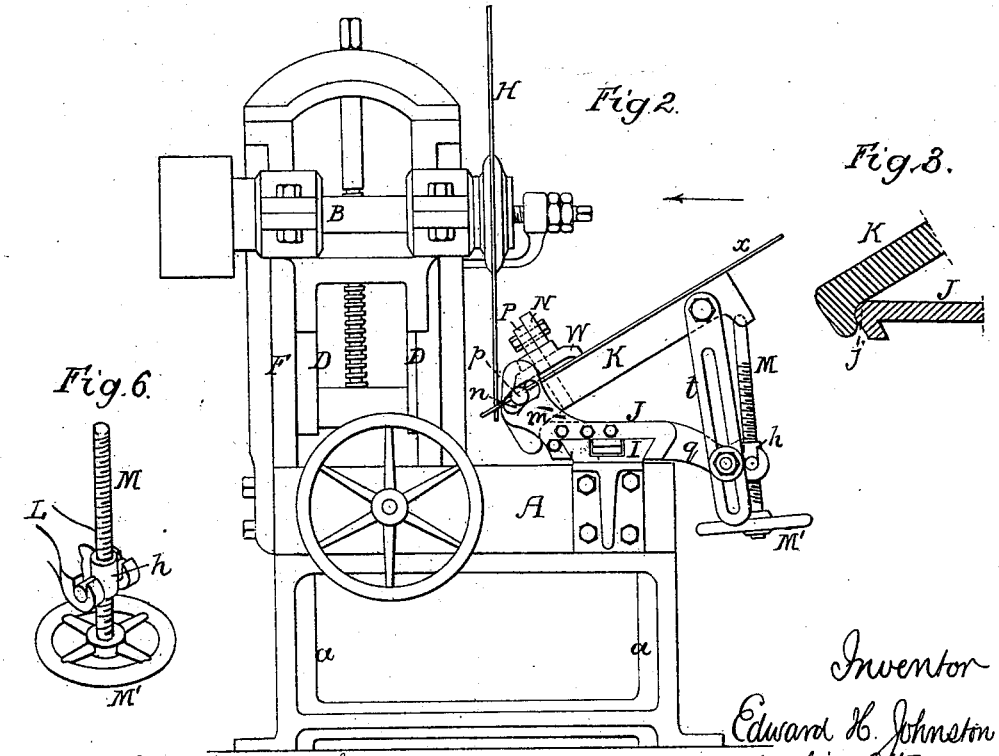
Witnesses  James F. Tobin
　　　　　　Harry Smith
Inventor
Edward H. Johnston
by his Attorneys
Howson and Sons
N. PETERS, Photo-Lithographer, Washington, D. C.

(No Model.) 2 Sheets—Sheet 2.
E. H. JOHNSTON.
MACHINE FOR BEVELING THE EDGES OF METAL PLATES.
No. 275,666. Patented Apr. 10, 1883.
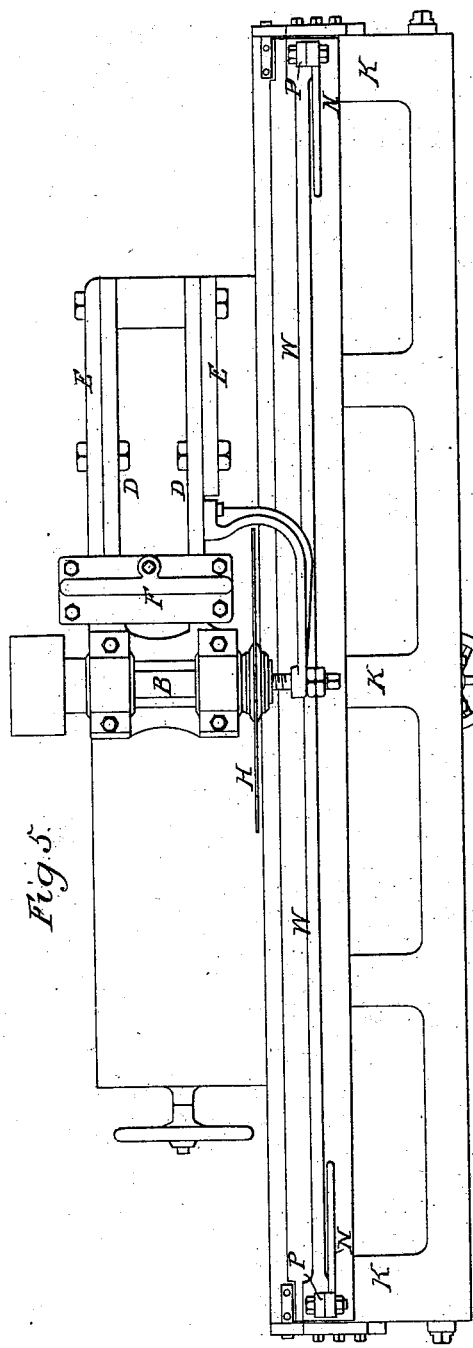
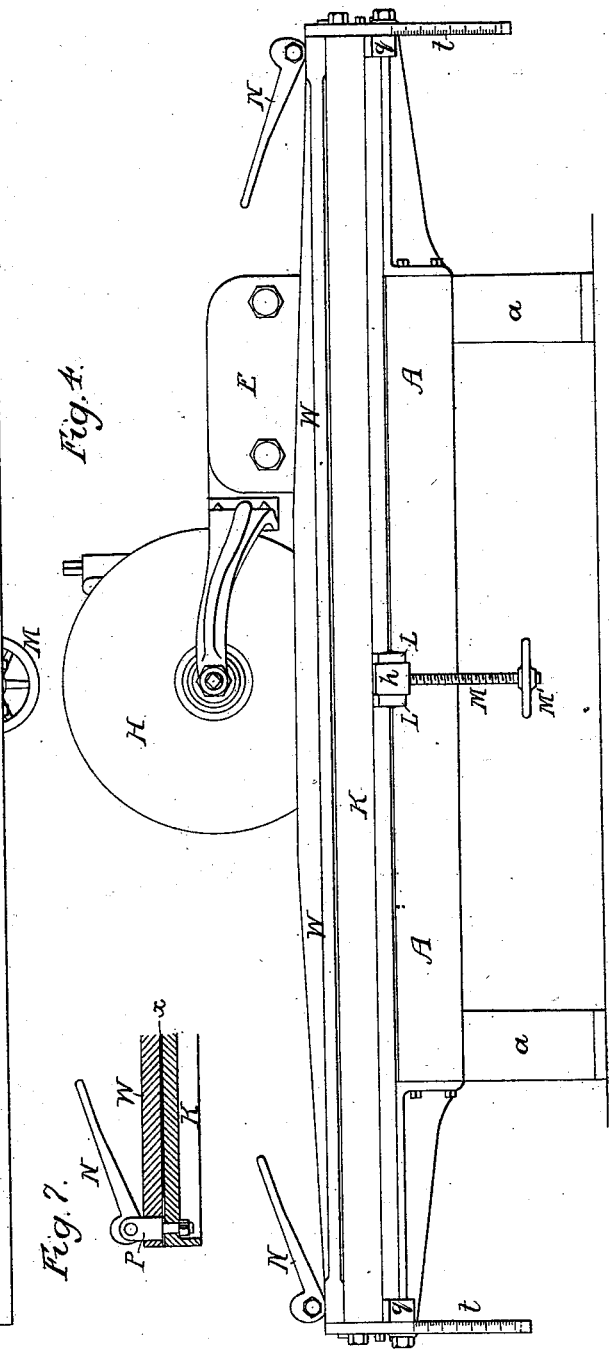
Witnesses James J. Tobin
Harry Smith
Inventor
Edward H. Johnston
by his Attorneys
Howson and Son

UNITED STATES PATENT OFFICE.

EDWARD H. JOHNSTON, OF PHILADELPHIA, PENNSYLVANIA, ASSIGNOR TO THE WHARTON RAILROAD SWITCH COMPANY, OF SAME PLACE.

MACHINE FOR BEVELING THE EDGES OF METAL PLATES.

SPECIFICATION forming part of Letters Patent No. 275,666, dated April 10, 1883.

Application filed June 19, 1882. (No model.)

*To all whom it may concern:*

Be it known that I, EDWARD H. JOHNSTON, a citizen of the United States, and a resident of Philadelphia, Pennsylvania, have invented certain Improvements in Mechanism for Beveling the Edges of Metal Plates, of which the following is a specification.

My invention consists of certain mechanism, fully described hereinafter, for rapidly and truly beveling the edges of plates to be used in the building of iron vessels, steam-boilers, &c., the plates being beveled for the purpose of affording the best facilities for properly calking the joints where the plates meet; and my invention consists mainly of the combination of a circular saw with a carriage to which is pivoted an adjustable frame for holding the plate to be beveled.

In the accompanying drawings, Figure 1, Sheet 1, is a vertical section of that part of the machine which carries the circular saw; Fig. 2, an end view of the machine, showing the saw, carriage, and adjustable frame for supporting the plate; Fig. 3, a detached view of part of Fig. 2; Fig. 4, Sheet 2, a side view of the machine, drawn to a reduced scale; Fig. 5, a plan view, and Figs. 6 and 7 views of detached portions of the machine.

A is the bed of the machine, supported by suitable stands or legs, $a$, and to this bed are secured frames E and F, a substantial arm, D, being pivoted to these frames, and the arm having bearings for the spindle B, carrying the circular saw H, which, as usual in machines of the class to which my invention relates, consists of a disk of iron or steel, preferably Bessemer steel.

It will not be necessary to describe more minutely this portion of the machine, first, because it forms the subject of a separate application for a patent, and, second, because an adjustable saw is not essential to my present invention, although it is preferred to a saw having a spindle adapted to fixed bearings.

To the bed of the machine is secured a long guide, I, parallel with the face of the saw, and to this guide is adapted a carriage, J. It has not been deemed necessary to illustrate or describe mechanism for traversing this carriage on the guide, as different well-known appliances may be used for that purpose.

A long frame, K, bears near one edge on the rounded edge $j$ of the carriage J, the frame being made to conform to the said rounded edge, as shown in Fig. 3. To each end of the carriage is secured a bracket, $m$, in which is an elongated slot, $n$, for receiving the pin $p$. It will be seen that the frame which carries the plate to be sawed is thus pivoted at one edge to the carriage; but instead of relying upon pivot-pins—one at each end—for supporting the frame, I prefer, in order to insure steadiness, to let the hollowed portion of the frame rest on the rounded edge of the carriage, the pins $p$, which pass through the slots in the brackets $m$, serving no other purpose than that of maintaining the frame in close contact with the said rounded edge of the carriage.

At each end of the carriage, and projecting from or secured to the same, is an arm, $q$, and to each end of the frame K is pivoted a slotted link, $t$, through which and through the said arm $q$ passes a bolt, the two links serving to maintain the frame at any angle to which it may be adjusted.

Different devices may be employed for raising and lowering the frame K at its outer edge; but I prefer for this purpose a screw-shaft, M, provided with a hand-wheel, M', and adapted to a nut, $h$, pivoted to the forked end of an arm, L, projecting from the carriage, as shown in Fig. 6. This elevating and lowering screw is situated midway between the opposite ends of the carriage, the upper rounded end of the screw entering a socket in the frame K. In Fig. 4 the frame K is not inclined as in Fig. 2, but is shown entirely depressed with the view of exhibiting the cam-levers N for clamping the plate $x$ to the frame. There are two of these cam-levers—one near each end of the frame K—each lever being pivoted to a stud, P, bolted to the frame K, and passing through the clamping-bar W, which extends throughout the entire length of the said frame K, the plate $x$ to be sawed being beneath the clamping-bar, which, by depressing the cam-levers, firmly secures the plate to the frame. After the plate $x$ has been thus clamped to the frame the entire carriage, frame, and plate are traversed on the guide I, while the saw cuts the plate to the desired bevel.

I claim as my invention—

1. The combination, in a machine for beveling plates, of a circular saw with a guided carriage, an adjustable frame pivoted to the said carriage, and devices for securing the plate to the frame, all substantially as set forth.

2. The combination of the carriage J and the frame K, pivoted thereto, with the slotted links $t$, serving to support the frame and to permit its adjustment to any desired angle, substantially as specified.

3. The combination of the carriage J, rounded at one edge, and the frame K, adapted to bear near one edge on the said rounded edge of the carriage, with the slotted brackets $m$ on the same for receiving pins on the frame, all substantially as set forth.

In testimony whereof I have signed my name to this specification in the presence of two subscribing witnesses.

EDWARD H. JOHNSTON.

Witnesses:
HARRY DRURY,
HARRY SMITH.